United States Patent [19]
Inoue

[11] Patent Number: 5,436,821
[45] Date of Patent: Jul. 25, 1995

[54] LOW-POWER CHARGE PUMP CIRCUIT AND LOW-POWER BOOSTER METHOD

[75] Inventor: Makoto Inoue, Kanagawa, Japan

[73] Assignee: NEC Corporation, Tokyo, Japan

[21] Appl. No.: 141,881

[22] Filed: Oct. 27, 1993

[30] Foreign Application Priority Data

Oct. 28, 1992 [JP] Japan .................. 4-313024

[51] Int. Cl.⁶ .............................................. H02K 9/00
[52] U.S. Cl. ................................................. 363/60
[58] Field of Search ............... 363/59, 60; 307/109, 307/110, 482; 365/226, 227

[56] References Cited

U.S. PATENT DOCUMENTS

| | | | |
|---|---|---|---|
| 4,106,086 | 8/1978 | Holbrook et al. | 363/60 |
| 4,704,706 | 11/1987 | Nakano et al. | 307/482 |
| 5,008,799 | 4/1991 | Montaluo | 363/60 |
| 5,193,198 | 3/1993 | Yokouchi | 363/60 |

FOREIGN PATENT DOCUMENTS

| | | | |
|---|---|---|---|
| 0123831 | 11/1984 | European Pat. Off. | G11C 5/00 |
| 2619970 | 3/1989 | France | H02M 3/07 |

OTHER PUBLICATIONS

Yuji Yatsuda et al., "A Byte Erasable 5V-Only 64Kbit EEPROM", ElectroCommunication . . . , 12 vol. J66-C No. 12, Dec. 1983, pp. 927-934.

Primary Examiner—Steven L. Stephan
Assistant Examiner—Matthew V. Nguyen
Attorney, Agent, or Firm—Sughrue, Mion, Zinn, Macpeak & Seas

[57] ABSTRACT

A charge pump circuit has a booster clock driver for outputting a clock signal changing between a power supply voltage and a ground voltage in response to a clock signal; a clock voltage control circuit connected to the booster clock driver for modifying a voltage level of the clock signal; a booster circuit connected to the clock voltage control circuit, provided with a capacitor to which the modified boosted clock signal is supplied and a boosted-voltage holding capacitor for holding a boosted voltage, for outputting the boosted output voltage; and a limiter connected to the booster circuit for limiting the output voltage. The clock voltage control circuit sets a high level of the clock signal at a voltage lower than the power supply voltage and a low level of the clock signal at a voltage higher than the ground voltage.

14 Claims, 8 Drawing Sheets

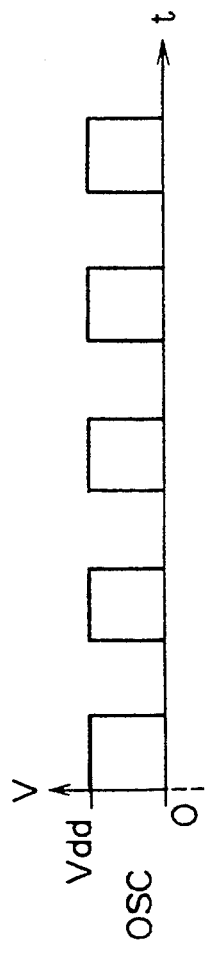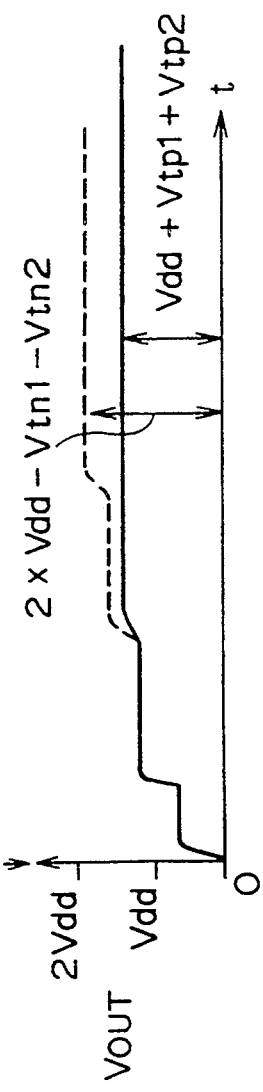
FIG. 8A (PRIOR ART)
FIG. 8B (PRIOR ART)

LOW-POWER CHARGE PUMP CIRCUIT AND LOW-POWER BOOSTER METHOD

BACKGROUND OF THE INVENTION

1. Field of the Invention

The present invention relates to a charge pump circuit, and more particularly to a charge pump circuit which dissipates small power.

2. Related Art

An example of a conventional charge pump circuit is shown in FIG. 7. The charge pump circuit shown in FIG. 7 includes: a booster clock driver 700 for driving a booster capacitor C1 by inputting a clock signal OSC shown in FIGS. 8A and 8B; a booster 701 constituted by an N-channel MOS transistor N1 for supplying a power supply voltage Vdd to the booster capacitor C1 and an N-channel MOS transistor N2 for supplying a booster voltage to a capacitor C2 for holding the booster voltage; and a limiter 703 for stabilizing the booster voltage output from the booster 701.

An operation of the charge pump circuit shown in FIG. 7 will now be described with reference to FIGS. 8A and 8B. FIG. 8A shows a waveform of a clock signal OSC and FIG. 8B shows a waveform of an output voltage Vout.

When the clock signal OSC shown in FIG. 8A is at the power supply voltage Vdd, the N-channel MOS transistor N3 is turned on and the P-channel MOS transistor P3 is turned off. Accordingly, a ground potential is supplied to a signal line E3. The booster capacitor C1 is charged by the power supply voltage Vdd through the N-channel MOS transistor N1. The potential V1 of the signal line E1 is expressed by equation (1) when a threshold value of the N-channel MOS transistor N1 assumed to be Vtn1.

$$V1 = Vdd - Vtn1 \quad (1)$$

When the clock signal OSC is changed to the ground potential, the N-channel MOS transistor N3 is turned off, and the P-channel MOS transistor P3 is turned on. Accordingly, the signal line E3 is charged to the power supply potential Vdd. A potential V1 of a signal line E1 is boosted by capacitive coupling and expressed by equation (2).

$$V1 = 2 \cdot Vdd - Vtn1 \quad (2)$$

Since the potential V1 exceeds a gate potential of the N-channel MOS transistor N1, the N-channel MOS transistor N1 is turned off. Accordingly, the charges charged by the signal line E1 are seldom discharged to the power supply Vdd side. Furthermore, since the potential of the signal line E1 is applied to a gate of the N-channel MOS transistor N2, the N-channel MOS transistor N2 is turned on and the capacitor C2 is charged. If the limiter 703 constituted by the P-channel MOS transistors P1 and P2 is absent, the potential Vout of the signal line E2 is boosted as shown by the dotted line in FIG. 8B and reaches a value expressed by the equation (3) when a threshold value of the MOS transistor N2 is assumed to be Vtn2.

$$VOUT = 2 \cdot Vdd - Vtn1 - Vtn2 \quad (3)$$

However, this voltage VOUT is stabilized by the limiter 703 (limited by the threshold values Vtp1, Vtp2 of the MOS transistors P1 and P2 and the power supply voltage), changed as shown by the solid line in FIG. 8B, and reaches a value expressed by the equation (4).

$$VOUT = Vdd + Vtp1 + Vtp2 \quad (4)$$

The potential difference V12 between the right side of the equation (3) and the right side of the equation (4) is expressed by equation (5).

$$V12 = Vdd - Vtn1 - Vtn2 - Vtp1 Vtp2 \quad (5)$$

The limiter 703 serves as a constant current source and current i flows into the limiter 703.

A power W4 dissipated by the limiter 703 is expressed by equation (6).

$$W4 = i \cdot (Vdd - (Vtn1 + Vtn2) - (Vtp1 + Vtp2)) \quad (6)$$

According to a conventional charge pump circuit, as shown in equation (6), the more the power supply voltage is high, the more the difference between the booster voltage expressed by the equation (3) and the limited potential expressed by the equation (4) becomes large, resulting in increased power dissipation.

SUMMARY OF THE INVENTION

An object of the present invention is to provide a low-power charge pump circuit and a low-power booster method.

According to a first aspect of the present invention, a charge pump circuit comprises: a booster clock driver (100) for outputting in response to a clock signal a clock signal which changes between a first voltage (Vdd) and a second voltage (a ground); a clock voltage control circuit (101, 201, 301) connected to the booster clock driver for generating a modified clock signal (V3) in which a high level of the clock signal is set lower than the first voltage and/or a low level thereof is set higher than the second voltage; a booster circuit (102) connected to the clock voltage control circuit and provided with a booster capacitor (C1) supplied by the modified booster clock signal and a boosted-voltage holding capacitor (C2) for holding a boosted voltage, for receiving the first voltage, and for generating an boosted output voltage higher than the first voltage; and a limiter (103) connected to the booster circuit (102) for stabilizing the output voltage.

For example, the first voltage is a power supply voltage (Vdd) and the second voltage is a ground voltage. The booster clock driver (100) outputs the clock signal a high level of which is the power supply voltage (Vdd) and a low level (ground) of which is the ground voltage.

The clock voltage control circuit (101, 301) sets the voltage of the high level of the clock signal to a voltage lower than the power supply voltage and/or the voltage of the low level of the clock signal to a higher voltage than the ground voltage. The clock voltage control circuit (101) comprises a first N-channel MOS transistor (N4) having a current path one terminal of which is connected to an output terminal of the booster clock driver (100) and the other terminal of which is connected to the booster capacitor (C1); a second N-channel MOS transistor (N6) having a current path one terminal of which is connected to the first N-channel MOS transistor (N4); and a third N-channel MOS transistor (N5) having a current path one terminal of which is connected to a gate and the other terminal of the second N-channel MOS transistor (N6) and to a gate and the other terminal of which applied are a first voltage. The clock voltage control circuit (201) comprises a first P-channel MOS transistor (P4) having a current path one terminal of which is connected to the output terminal of the booster clock driver (100) and the other terminal of which connected to the booster capacitor (C1); a second P-channel MOS transistor (P6) having a current path one terminal of which is connected to the first P-channel MOS transistor (P4); and a third P-channel MOS transistor (P5) having a current path one terminal of which is connected to the gate and the other terminal of the current path of the second P-channel MOS transistor (P6) and to a gate and the other terminal of which applied are a second voltage. The clock voltage control circuit (301) comprises a fourth P-channel MOS transistor (P4) a gate of which and one terminal of the current path are connected to the output terminal of the booster clock driver (100) and one terminal of the booster capacitor (C1), and to the other terminal of the current path applied is a second voltage; and a fourth N-channel MOS transistor (N4) a gate of which and one terminal of the current path are connected to the output terminal of the booster clock driver (100) and one terminal of the booster capacitor, and to the other terminal of the current path applied is the first voltage.

Further, a method of boosting a voltage according to the present invention, comprises: a clock generating step for outputting a clock signal which changes between a first voltage (Vdd) and a second voltage (ground) in response to a clock signal; a clock modifying step for modifying a high level of the clock signal generated by the clock generating step to a voltage lower than the first voltage, and/or modifying the low level thereof to a voltage higher than the second voltage and for generating a modified clock signal; a boosting step for driving the booster capacitor (C1) by the modified clock signal to obtain the boosted voltage and for holding the boosted voltage by a boosted-voltage capacitor (C2); and a step for stabilizing the voltage generated by the boosting step.

For example, the first voltage is a power supply voltage (Vdd) and the second voltage is a ground voltage. The clock generating step generates a clock signal a high level of which is the power supply voltage and a low level of which is the ground voltage.

The clock modifying step modifies the high-level voltage of the clock signal to a voltage lower than the power supply voltage and/or the low-level voltage of the clock signal to a voltage higher than the ground voltage.

BRIEF DESCRIPTION OF THE DRAWINGS

FIG. 8A is a waveform of a boosted clock signal to be supplied to the charge pump circuit shown in FIG. 7; and FIG. 8B is a waveform of an output signal of the charge pump circuit shown in FIG. 7.

DETAILED DESCRIPTION OF THE PREFERRED EMBODIMENTS

An example of a charge pump circuit according to a first embodiment of the present invention will now be described with reference to the drawings.

Figure 1:
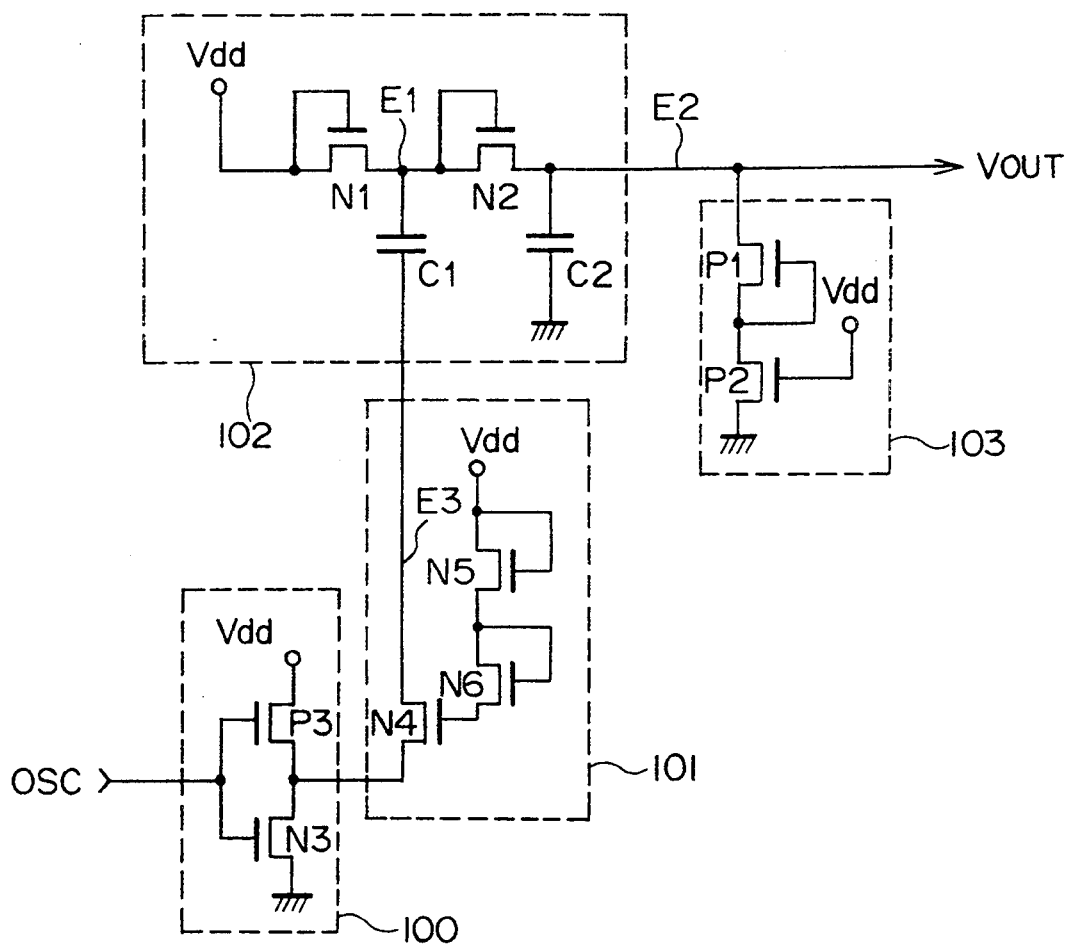
FIG. 1 is a circuit diagram of a charge pump circuit according to a first embodiment of the present invention.

The charge pump circuit shown in FIG. 1 comprises a booster clock driver 100, a control circuit 101, a booster circuit 102, and a limiter 103.

The booster clock driver 100 includes an inverter constituted by an N-channel MOS transistor N3 and a P-channel MOS transistor P3.

An output of the booster clock driver 100 is supplied to the booster clock voltage control circuit 101. The booster clock voltage control circuit 101 comprises an N-channel MOS transistor N5, the source and gate of which are connected to a power supply, an N-channel MOS transistor N6, the source and gate of which are connected to a drain of the MOS transistor N5, and an N-channel MOS transistor N4, a gate of which is connected to a drain of the N-channel MOS transistor N6. A source of the N-channel MOS transistor N4 is connected to an output terminal of the booster clock driver 100. A drain of the N-channel MOS transistor N4 is connected to one terminal of a booster capacitor C1 within the booster circuit 102.

To the other terminal of the booster capacitor C1 is connected to a drain of an N-channel MOS transistor N1, the source and gate of which are connected to the power supply, and a source and a gate of an N-channel MOS transistor N2. A drain of the N-channel MOS transistor N2 is connected to a capacitor C2 for holding a boosted potential. A node between the N-channel MOS transistor N2 and the capacitor C2 serves as an output terminal of the charge pump circuit.

To the output terminal is connected to the limiter 103 which is constituted by the P-channel MOS transistors P1 and P2. A source of the P-channel MOS transistor P2 is grounded and a power supply voltage Vdd is applied to the gate thereof. A drain of the P-channel MOS transistor P2 is connected to the source and the gate of the P-channel MOS transistor P1.

An operation of the charge pump circuit shown in FIG. 1 will now be described with reference to FIGS.

Figure 2:
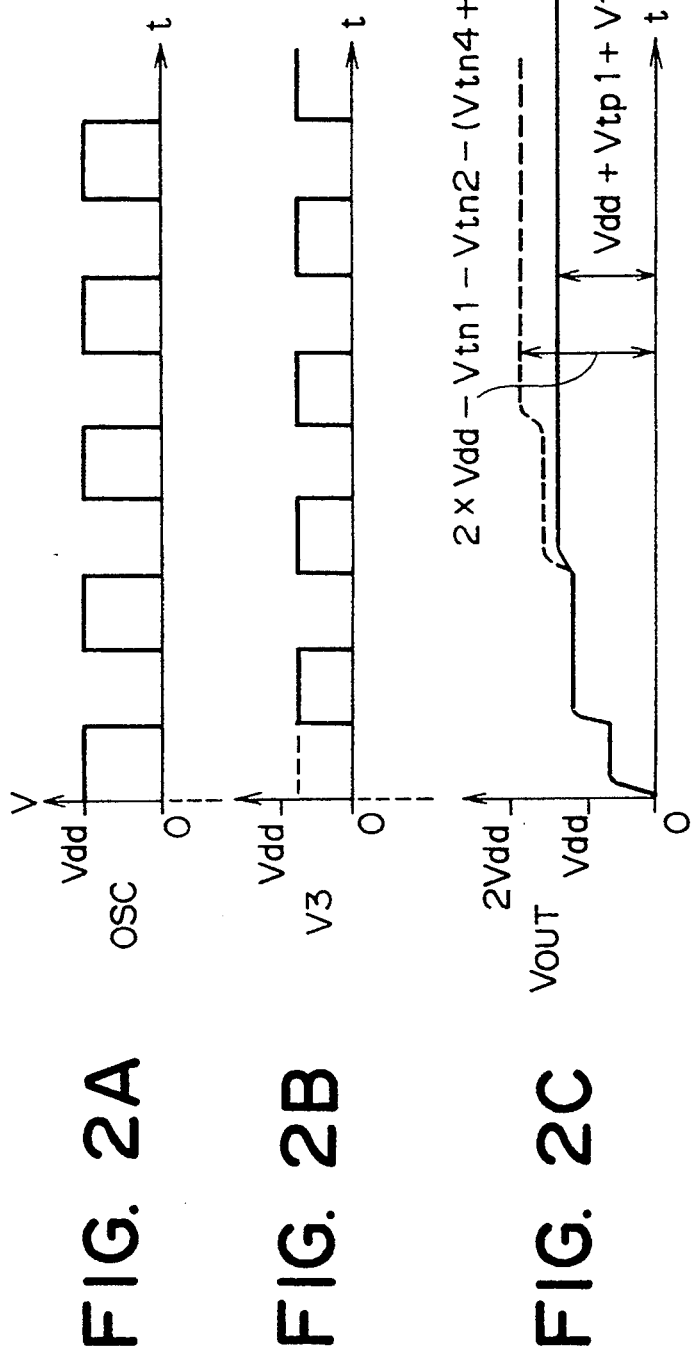
FIG. 2A is a waveform of a boosted clock signal to be supplied to the charge pump circuit shown in FIG. 1.
FIG. 2B is a waveform of a clock signal to be supplied to a booster circuit of the charge pump circuit shown in FIG. 1.
FIG. 2C is a waveform of an output voltage of the charge pump circuit shown in FIG. 1.

2A through 2C. FIG. 2A shows a waveform of an clock signal OSC. FIG. 2B is a waveform showing a potential V3 of a signal line E3. FIG. 2C shows a waveform of an output voltage VOUT.

When the clock signal OSC shown in FIG. 2A is at the power supply voltage Vdd, the N-channel MOS transistor N3 is turned on, and the P-channel MOS transistor P3 is turned off. Accordingly, the output terminal of the booster clock driver 100 is at a ground potential. A voltage "Vdd-Vtn5-Vtn6" dropped by a sum of respective threshold values Vtn5 and Vtn6 of the N-channel MOS transistors N5 and N6 from the power supply voltage Vdd is supplied to the drain of the N-channel MOS transistor N6 within the booster clock voltage control circuit 101.

Since the source potential of the N-channel MOS transistor N4 is at the ground potential, the N-channel MOS transistor N4 is turned on and the voltage of the signal line E3 is at the ground potential. The booster capacitor C1 is charged by the power supply voltage Vdd through the N-channel MOS transistor N1. The potential V1 of the signal line E1 is expressed by the above described equation (1) when a threshold value of the MOS transistor N1 is assumed to be Vtn1.

Thereafter, when the clock signal OSC shown in FIG. 2A is changed to the ground potential, the N-channel MOS transistor N3 is turned off and the P-channel MOS transistor P3 is turned on. Accordingly, the output voltage of the booster clock driver 100 is at the power supply potential Vdd. However, since the gate potential of the N-channel MOS transistor N4 is limited to the "Vdd-Vtn5-Vtn6", the voltage V3 of the signal line E3 is only boosted up to a value expressed by equation (7) as shown in FIG. 2B.

$$V3 = Vdd - (Vtn4 + Vtn5 + Vtn6) \quad (7)$$

At this time, the voltage V1 of the signal line E1 is boosted by capacitive coupling and reaches a value expressed by equation (8).

$$V1 = 2 \cdot Vdd - Vtn1 - (Vtn4 + Vtn5 + Vtn6) \quad (8)$$

Since the boosted potential V1 exceeds the gate potential of the N-channel MOS transistor N1, the N-channel MOS transistor N1 is turned off, and the charges charged in the signal line E1 seldom discharge to the power supply Vdd side. Furthermore, the potential V1 of the signal line E1 is applied to the gate of the N-channel MOS transistor N2. For this reason, the N-channel MOS transistor N2 is turned on and the capacitor C2 is charged. If the limiter 103 constituted by the P-channel MOS transistors P1 and P2 is absent, the potential of the signal line E2, i.e., the output voltage VOUT is boosted as shown in the dotted line in FIG. 2C when the threshold value of the MOS transistor N2 is assumed to be Vtn2, and stabilized into a value expressed by equation (9).

$$VOUT = 2 \cdot Vdd - Vtn1 - Vtn2 - (Vtn4 + Vtn5 + Vtn6) \quad (9)$$

However, due to the effect of the limiter 103, this voltage VOUT is stabilized (limited by the respective threshold values Vtp1 and Vtp2 of the MOS transistors P1 and P2 and the power supply voltage), and the voltage VOUT is changed as shown by the solid line in FIG. 2C and reaches a value expressed by equation (4A).

$$VOUT = Vdd + Vtp1 + Vtp2 \quad (4A)$$

The potential difference V12 between the right side in the equation (9) and the right side in the equation (4A) is expressed by equation (10).

$$V12 = Vdd - Vtp1 - Vtp2 - Vtn1 Vtn2 - (Vtn4 + Vtn5 + Vtn6) \quad (10)$$

The limiter 103 serves as a constant current source and a current i flows into the limiter 103.

A power W1 dissipated by the limiter 103 is expressed by equation (11).

$$W1 = i \cdot (Vdd - (Vtn1 + Vtn2) - (Vtp1 + Vtp2) - (Vtn4 + Vtn5 + Vtn6)) \quad (11)$$

As is apparent from the comparison of the equations (6) and (11), the dissipated power of the limiter 103 of the charge pump circuit according to the present invention is smaller than that of a limiter of a conventional charge pump circuit.

Figure 3:
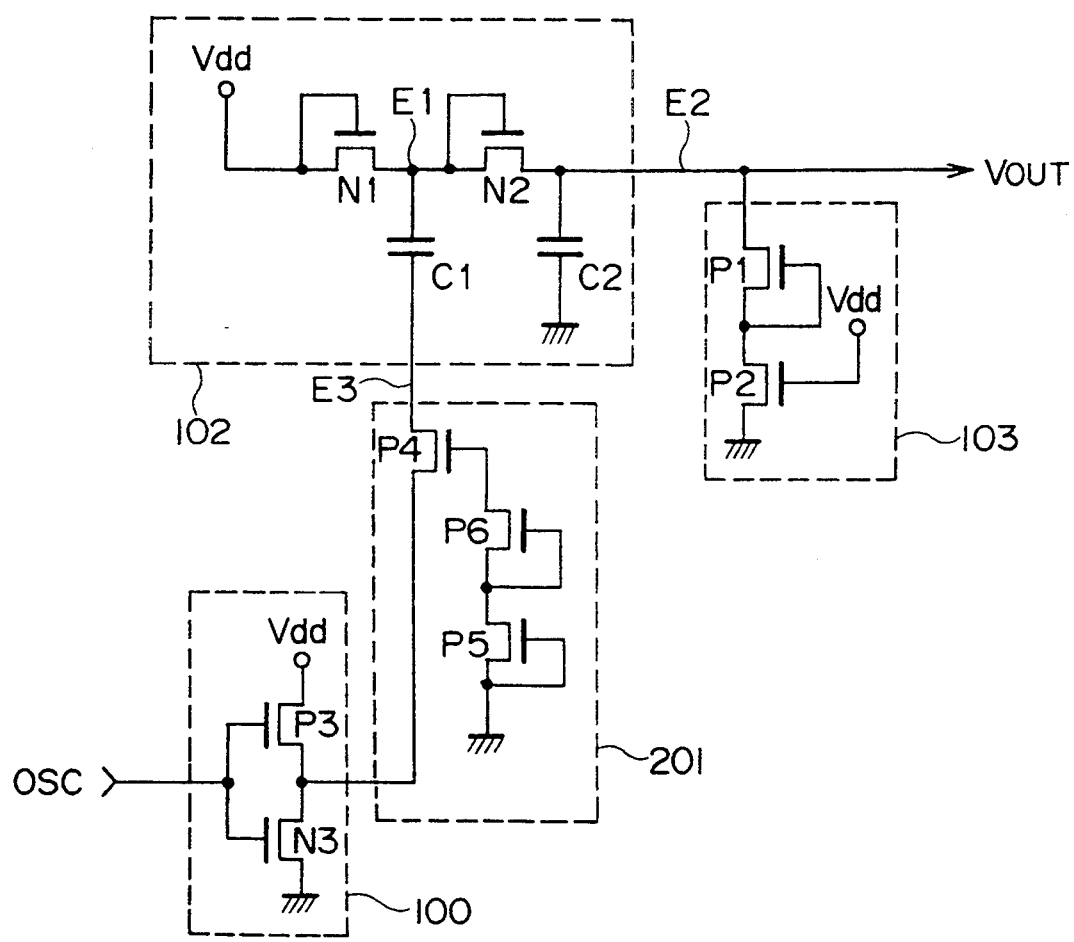
FIG. 3 is a circuit diagram of a charge pump circuit according to a second embodiment of the present invention.

A charge pump circuit according to a second embodiment of the present invention will now be described with reference to FIG. 3.

The second embodiment differs from the first embodiment in that a booster clock voltage control circuit 201 comprises P-channel MOS transistors P4, P5, and P6.

A source and a gate of the P-channel MOS transistor P5 are grounded, and a drain of the P-channel MOS transistor P5 is connected to a source and a gate of the P-channel MOS transistor P6. The P-channel MOS transistor P4 has a source connected to the output terminal of the booster clock driver 100, a gate connected to the drain of the P-channel MOS transistor P6, and a drain connected to the one terminal of the booster capacitor C1 the booster circuit 102.

An operation of the charge pump circuit shown in FIG. 3 will now be described with reference to FIGS. 4A through 4C.

Figures 4A, 4B, 4C:
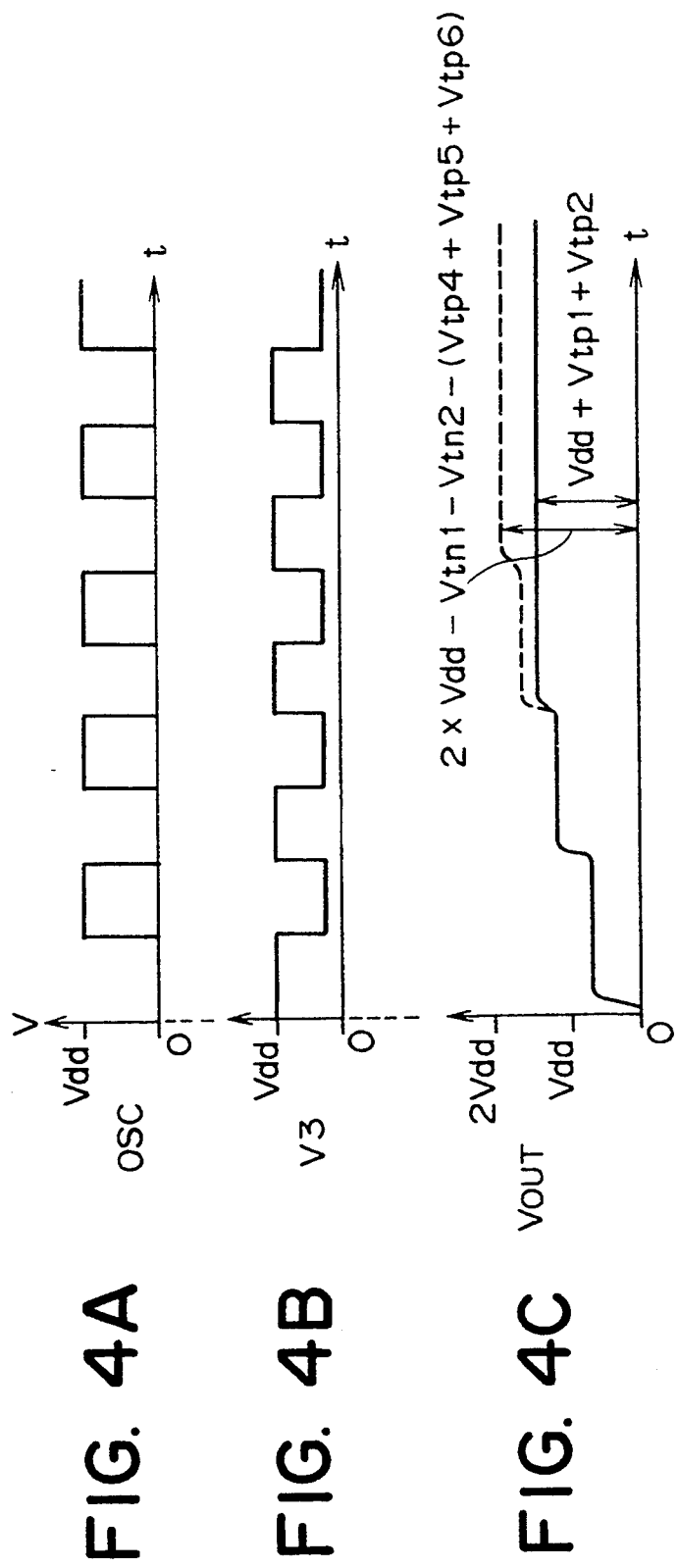
FIG. 4A is a waveform of a boosted clock signal to be supplied to the charge pump circuit shown in FIG. 3A.
FIG. 4B is a waveform of a clock signal to be supplied to a booster circuit of the charge pump circuit shown in FIG. 3.
FIG. 4C is a waveform of an output voltage of the charge pump circuit shown in FIG. 3.

FIG. 4A shows a waveform of the clock signal OSC. FIG. 4B shows a waveform of the potential V3 of the signal line E3. FIG. 4C shows a waveform of the output voltage VOUT.

When the clock signal OSC shown in FIG. 4A is at the ground potential, the N-channel MOS transistor N3 is turned off, and the P-channel MOS transistor P3 is turned on. Accordingly, the power supply voltage Vdd is supplied to the output terminal of the booster clock driver 100. A sum "Vtp5+Vtp6" of the respective threshold values Vtp5 and Vtp6 of the P-channel MOS transistors P5 and P6 is supplied to the drain of the P-channel MOS transistor P6 within the booster clock voltage control circuit 201.

Since the source potential of the P-channel MOS transistor P4 is at the power supply voltage Vdd, the P-channel MOS transistor P4 is turned on and the voltage V3 of the signal line E3 is at the power supply voltage Vdd as shown in FIG. 4B.

Thereafter, when a level of the clock signal OSC shown in FIG. 4A changes to the power supply voltage Vdd, the N-channel MOS transistor N3 is turned on and the P-channel MOS transistor P3 is turned off. Accordingly, the output terminal of the booster clock driver 100 is discharged to the ground potential. However, since the gate potential of the P-channel MOS transistor P4 is at the "Vtp5+Vtp6", the voltage V3 of the signal line E3 only drops to a value expressed by equation (12) as shown in FIG. 4B.

$$V3 = Vtp4 + Vtp5 + Vtp6 \qquad (12)$$

Accordingly, the voltage V3 of the signal line E3 changes between the power supply voltage Vdd and the value expressed by the equation (12), as shown in FIG. 4B. If the limiter 103 is absent, the potential VOUT of the signal line E2 changes as shown by the dotted line in FIG. 4C and reaches a value expressed by equation (13).

$$VOUT = 2 \cdot Vdd - Vtn1 - Vtn2 - (Vtn4 + Vtn5 + Vtn6) \qquad (13)$$

However, due to the effect of the limiter 103, the voltage VOUT is stabilized into a value expressed by the equation (4A).

The potential difference V12 between the right side of the equation (13) and the right side of the equation (4A) is expressed by equation (14).

$$V12 = Vdd - Vtp1 - Vtp2 - Vtn1 - Vtn2 - (Vtp4 + Vtp5 + Vtp6) \qquad (14)$$

A power W2 dissipated by the limiter 103 is expressed by equation (15).

$$W2 = i \cdot \{Vdd - (Vtn1 + Vtn2) - (Vtp1 + Vtp2) - (Vtp4 + Vtp5 + Vtp6)\} \qquad (15)$$

As is apparent from the comparison of the equations (6) and (15), the dissipated power of the limiter 103 in the charge pump circuit according to the embodiment is smaller than that of the limiter in the conventional charge pump circuit.

Figure 5:
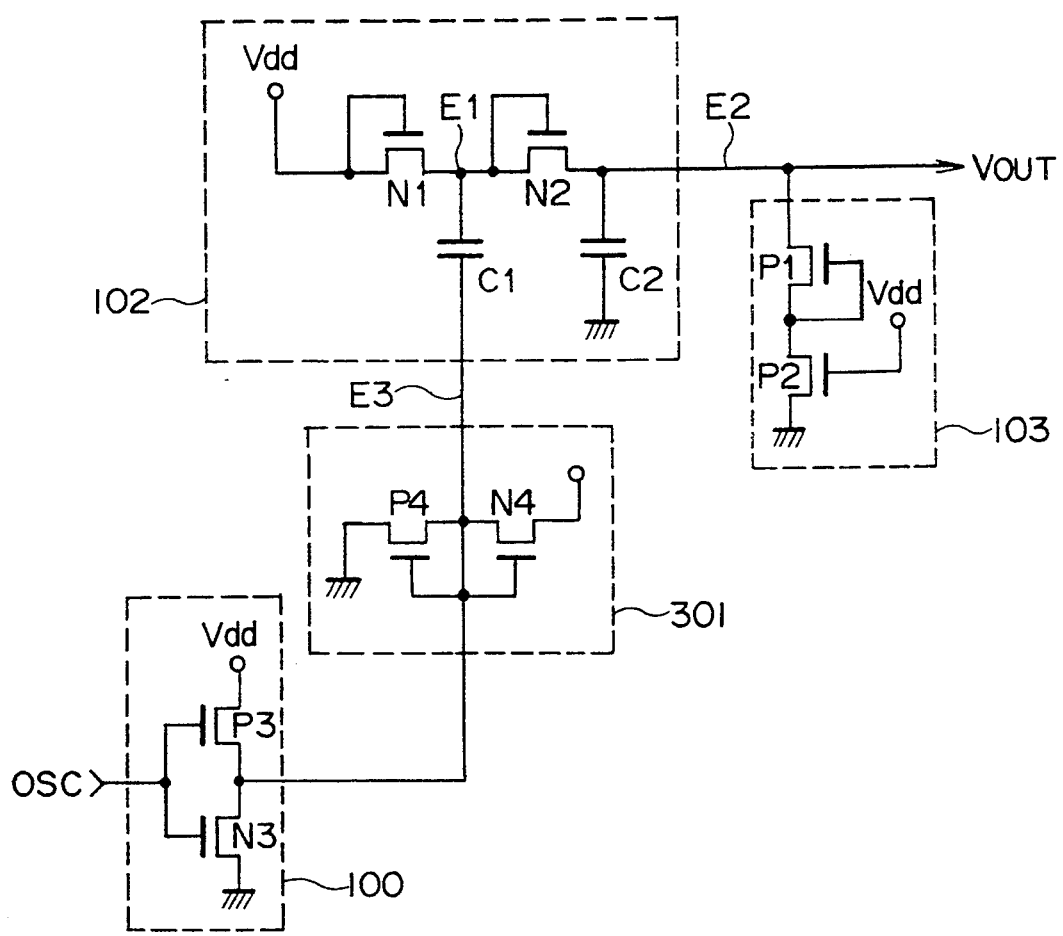
FIG. 5 is a circuit diagram of a charge pump circuit according to a third embodiment of the present invention.

A charge pump circuit according to a third embodiment of the present invention will now be described with reference to FIG. 5.

The third embodiment differs from the first embodiment in that a booster clock voltage control circuit 301 comprises a P-channel MOS transistor P4 and an N-channel MOS transistor N4.

A source of the P-channel MOS transistor P4 is grounded, and a source of the N-channel MOS transistor N4 applied is the power supply voltage Vdd. The gates of the MOS transistors P4 and N4 are together connected to the output terminal of the booster clock driver 100, and the drains thereof are together connected to one terminal of the booster capacitor C1 of the booster circuit 102.

Figures 6A, 6B, 6C:
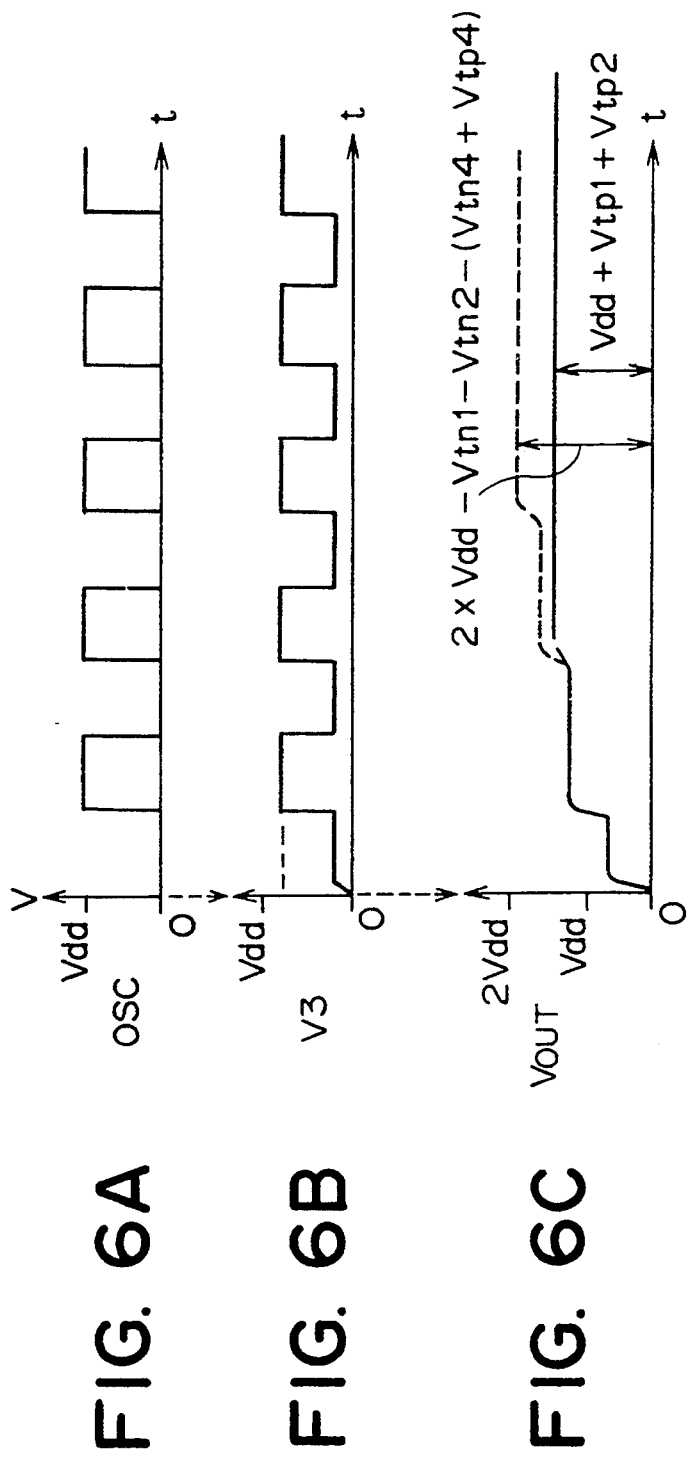
FIG. 6A is a waveform of a boosted clock signal to be supplied to the charge pump circuit shown in FIG. 5.
FIG. 6B is a waveform of a clock signal to be supplied to a booster circuit of the charge pump circuit shown in FIG. 5.
FIG. 6C is a waveform of an output voltage of the charge pump circuit shown in FIG. 5.

An operation of the charge pump circuit shown in FIG. 5 will now be described with reference to FIGS. 6A through 6C. FIG. 6A is a waveform of the clock signal OSC. FIG. 6B is a waveform of the potential V3 of the signal line E3. FIG. 6C shows a waveform of the output voltage VOUT.

When the clock signal OSC shown in FIG. 6A is at the ground potential, the N-channel MOS transistor N3 is turned off, and the P-channel MOS transistor P3 is turned on. Accordingly, the output terminal of the booster clock driver 100 supplied is at the power supply potential Vdd. For this reason, the N-channel MOS transistor N4 is turned on and the P-channel MOS transistor P4 is turned off. The potential V3 of the signal line E3 takes a value expressed by equation (16) as shown in FIG. 6B due to the threshold value Vtn4 of the N-channel MOS transistor N4.

$$V3 = Vdd - Vtn4 \qquad (16)$$

When the clock signal OSC shown in FIG. 6A changes to the power supply potential Vdd, the N-channel MOS transistor N3 is turned on and the P-channel MOS transistor P3 is turned off. Accordingly, the output terminal of the booster clock driver 100 is discharged to a level of the ground voltage. Accordingly, the N-channel MOS transistor N4 is turned off, and the P-channel MOS transistor P4 is turned on. For this reason, the voltage V3 of the signal line E3 only drops to a value expressed by equation (17) when a threshold value of the P-channel MOS transistor P4 is assumed to be Vtp4.

$$V3 = Vtp4 \qquad (17)$$

Accordingly, the voltage V3 of the signal line E3 changes between the voltage expressed by the equation (17) and the voltage expressed by the equation (16), as shown in FIG. 6B. If the limiter 103 is absent, the potential of the signal line E2, i.e., the output voltage VOUT changes as shown by the dotted line in FIG. 6C and reaches a value expressed by equation (18).

$$VOUT = 2 \cdot Vdd - Vtn1 - Vtn2 - (Vtn4 + Vtp4) \qquad (18)$$

However, the voltage VOUT is stabilized into a value expressed by the equation (4A) due to the effect of the limiter 103.

The potential difference V12 between the right side of the equation (18) and the right side of the equation (4A) is expressed by equation (19).

$$V12 = Vdd - Vtp1 - Vtp2 - Vtn1 - Vtn2 - (Vtp4 + Vtn4) \qquad (19)$$

A power W3 dissipated by the limiter 103 is expressed by equation (20).

$$W3 = i \cdot \{Vdd - (Vtn1 + Vtn2) - (Vtp1 + Vtp2) - (Vtp4 + Vtp5)\} \qquad (20)$$

As is apparent from the comparison of the equations (6) and (20), the dissipated power of the limiter 103 in the charge pump circuit according to the present embodiment is smaller than that of the limiter in the conventional charge pump circuit.

Figure 7:
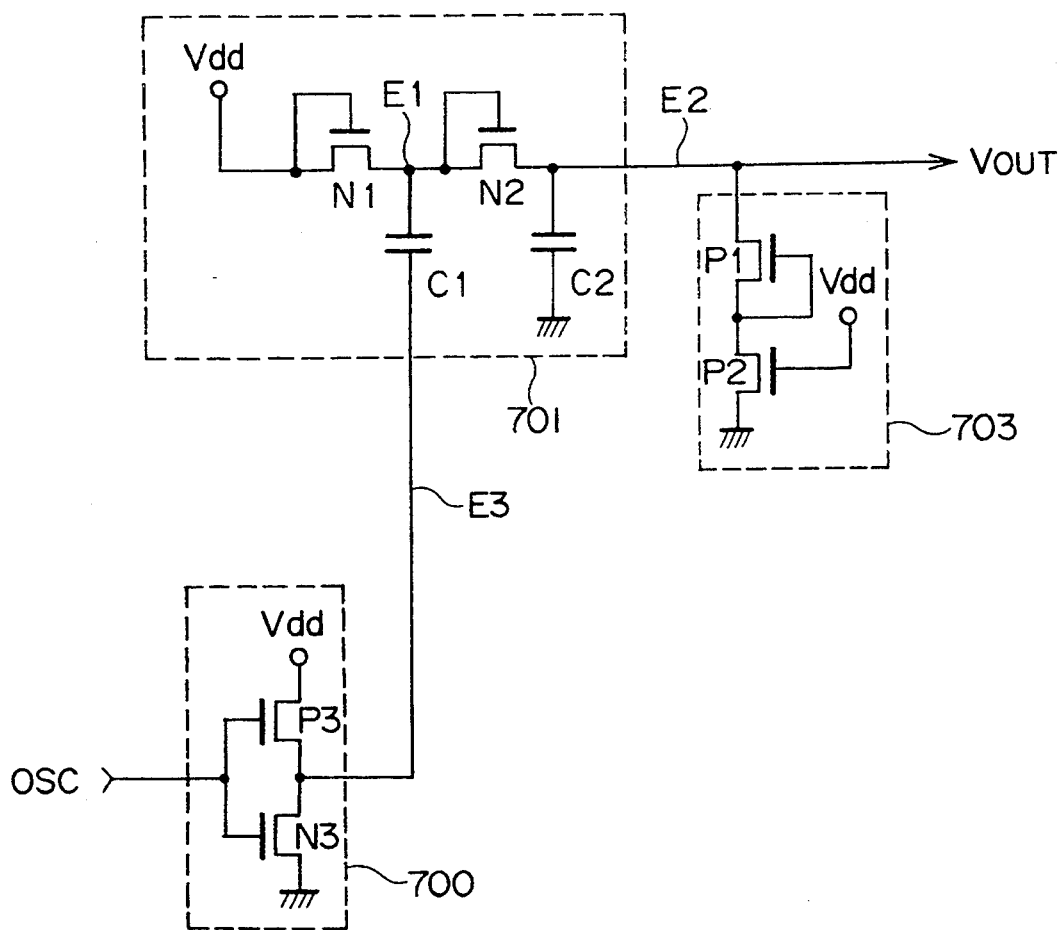
FIG. 7 is a circuit diagram of a conventional charge pump circuit.

As has been described above, the dissipated power of the limiter in the charge pump circuit according to the first embodiment of the present invention is lesser than that of the limiter in the conventional charge pump circuit shown in FIG. 7 by "i·(Vtn4+Vtn5+Vtn6)".

The dissipated power of the limiter in the charge pump circuit according to the second embodiment of the present invention is lesser than that of the limiter in the conventional charge pump circuit shown in FIG. 7 by "i·(Vtp4+Vtp5+Vtn6)".

The dissipated power of the limiter in the charge pump circuit according to the third embodiment of the present invention is lesser than that of the limiter in the conventional charge pump circuit shown in FIG. 7 by "i·(Vtp4+Vtn4)".

As has been described above, an addition of a voltage control circuit for controlling an amplitude of the booster clock (V3) within a range between the power supply voltage Vdd and the ground voltage permits the dissipated power of the charge pump circuit to be reduced.

What is claimed is:

1. A charge pump circuit, comprising: a booster clock driver for outputting a clock signal changing between a first voltage and a second voltage in response to an input clock signal;
- a clock voltage control circuit connected to the booster clock driver for generating a modified clock signal in which a high level of the clock signal is set at a voltage lower than the first voltage, and/or a low level of the clock signal is set at a voltage higher than the second voltage;
- a booster circuit connected to the clock voltage control circuit, wherein the booster circuit comprises a booster capacitor to which the modified clock signal is supplied and a boosted-voltage holding capacitor for holding a boosted voltage, wherein the booster circuit receives the first voltage, and wherein the booster circuit generates a boosted output voltage higher than the first voltage; and
- a limiter connected to the booster circuit for stabilizing the boosted output voltage.

2. The charge pump circuit according to claim 1, wherein:
- the first voltage is a power supply voltage and the second voltage is a ground voltage;
- the booster clock driver outputs the clock signal wherein the high level of the clock signal equals the power supply voltage and the low level of the clock signal equals the ground voltage; and
- the clock voltage control circuit adjusts the high level of the clock signal to a voltage lower than the power supply voltage.

3. The charge pump circuit according to claim 1, wherein:
- the first voltage is a power supply voltage and the second voltage is a ground voltage;
- the booster clock driver outputs the clock signal wherein the high level of the clock signal equals the power supply voltage and the low level of the clock signal equals the ground voltage; and
- the clock voltage control circuit adjusts the low level of the clock signal to a voltage higher than the ground voltage.

4. The charge pump circuit according to claim 1, wherein the clock voltage control circuit comprises:
- a first N-channel MOS transistor wherein one terminal of a current path of the first N-channel MOS transistor is connected to an output terminal of the booster clock driver and an other terminal of the current path of the first N-channel MOS transistor is connected to the booster capacitor;
- a second N-channel MOS transistor wherein one terminal of a current path of the second N-channel MOS transistor is connected to the first N-channel MOS transistor; and
- a third N-channel MOS transistor wherein one terminal of a current path of the third N-channel MOS transistor is connected to a gate and an other terminal of the current path of the second N-channel MOS transistor and wherein an other terminal of the current path and a gate of the third N-channel MOS transistor is connected to the first voltage.

5. The charge pump circuit according to claim 1, wherein the clock voltage control circuit comprises:
- a first P-channel MOS transistor wherein one terminal of a current path of the first P-channel MOS transistor is connected to an output terminal of the booster clock driver and an other terminal of the current path of the first P-channel MOS transistor is connected to the booster capacitor;
- a second P-channel MOS transistor wherein one terminal of a current path of the second P-channel MOS transistor is connected to the first P-channel MOS transistor; and
- a third P-channel MOS transistor wherein one terminal of a current path of the third P-channel MOS transistor is connected to a gate and an other terminal of the current path of the second P-channel MOS transistor and wherein an other terminal of the current path and a gate of the third P-channel MOS transistor is connected to the second voltage.

6. The charge pump circuit according to claim 1, wherein the clock voltage control circuit comprises:
- a fourth P-channel MOS transistor wherein one terminal of a current path and a gate of the fourth P-channel MOS transistor are connected to an output terminal of the booster clock driver and one terminal of the booster capacitor and wherein an other terminal of the current path of the fourth P-channel MOS transistor is connected to the second voltage; and
- an N-channel MOS transistor wherein one terminal of a current path and a gate of the N-channel MOS transistor are connected to an output terminal of the booster clock driver and the one terminal of the booster capacitor and wherein an other terminal of the current path of the N-channel MOS transistor is connected to the first voltage.

7. The charge pump circuit according to claim 1, wherein the booster clock driver comprises:
- a P-channel MOS transistor having a gate to which the clock signal is supplied, a source to which the first voltage is applied, and a drain connected to an output terminal of the booster clock driver; and
- an N-channel MOS transistor having a gate to which the clock signal is supplied, a source to which the second voltage is applied, and a drain connected to the output terminal of the booster clock driver.

8. The charge pump circuit according to claim 1, wherein the booster circuit comprises:
- the booster capacitor wherein one terminal of the booster capacitor receives the modified clock signal;
- a first N-channel MOS transistor wherein one terminal of a current path and a gate of the first N-channel MOS transistor is connected to the first voltage, and an other terminal of the current path of the first N-channel MOS transistor is connected to an other terminal of the booster capacitor;
- a second N-channel MOS transistor wherein one terminal of a current path and a gate of the second N-channel MOS transistor are connected to the other terminal of the booster capacitor, and an other terminal of the current path of the second N-channel MOS transistor is connected to an output terminal of the booster circuit; and
- the boosted-voltage holding capacitor wherein one terminal of the boosted-voltage holding capacitor is connected to the output terminal of the booster circuit and an other terminal of the boosted-voltage holding capacitor receives a predetermined voltage.

9. The charge pump circuit according to claim 1, wherein the limiter comprises:
- one P-channel MOS transistor wherein one terminal of a current path of the one P-channel MOS transistor is connected to an output terminal of the booster circuit; and an other P-channel MOS transistor wherein one terminal of a current path of the other P-channel MOS transistor is connected to an other terminal of the current path and a gate of the one P-channel MOS transistor, wherein an other terminal of the current path of the other P-channel MOS transistor receives the second voltage, and wherein a gate of the other P-channel MOS transistor receives the first voltage.

10. A method for boosting a voltage, comprising the steps of:

a clock generating step for outputting a clock signal changing between a first voltage and a second voltage in response to an input clock signal;

a clock modifying step for generating a modified clock signal in which a high level of the clock signal generated by the clock generating step is set at a voltage lower than the first voltage and/or a low level of the clock signal is set at a voltage higher than the second voltage;

a boosting step for driving a booster capacitor by the modified clock signal to obtain a boosted voltage and for holding the boosted voltage by a voltage holding capacitor; and a stabilizing step for stabilizing the boosted voltage generated by the boosting step.

11. The method according to claim 10, wherein:

the first voltage is a power supply voltage and the second voltage is a ground voltage;

the clock generating step generates the clock signal wherein the high level of the clock signal is equal to the power supply voltage and the low level of the clock signal is equal to the ground voltage; and the clock modifying step modifies the high level of the clock signal to a voltage lower than the power supply voltage.

12. The method according to claim 10, wherein:

the first voltage is a power supply voltage and the second voltage is a ground voltage;

the clock generating step generates the clock signal wherein the high level of the clock signal is equal to the power supply voltage and the low level of the clock signal is equal to the ground voltage; and the clock modifying step modifies the voltage of the low level of the clock signal to a voltage higher than the ground voltage.

13. The method according to claim 10, wherein:

the first voltage is a power supply voltage and the second voltage is a ground voltage;

the clock generating step generates the clock signal wherein the high level of the clock signal is equal to the power supply voltage and the low level of the clock signal is equal to the ground voltage; and the clock modifying step modifies the high level of the clock signal to a voltage lower than the power supply voltage and modifies the low level of the clock signal to a voltage higher than the ground voltage.

14. A charge pump circuit, comprising:

a booster clock driver for outputting a clock signal changing between a first voltage and a second voltage in response to an input clock signal;

a clock voltage control circuit connected to the booster clock driver for generating a modified clock signal in which a high level of the clock signal is set at a voltage lower than the first voltage, and/or a low level of the clock signal is set at a voltage higher than the second voltage;

a booster circuit connected to the clock voltage control circuit for generating a boosted output voltage which is higher than the first voltage; and a limiter connected to the booster circuit for stabilizing the boosted output voltage.

* * * * *